United States Patent
Cannon et al.

(10) Patent No.: US 6,628,759 B1
(45) Date of Patent: Sep. 30, 2003

(54) ALERT SIGNAL DURING TELEPHONE CONVERSATION

(75) Inventors: Joseph M. Cannon, Harleysville, PA (US); James A. Johanson, Macungie, PA (US); Philip D. Mooney, North Wales, PA (US); Richard M. Ubowski, Harleysville, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/458,651

(22) Filed: Dec. 10, 1999

(51) Int. Cl.[7] .................. H04M 1/64; H04M 11/04; H04M 1/00
(52) U.S. Cl. .............. 379/67.1; 379/48; 379/72; 379/93.35; 379/88.12; 379/88.01; 379/106.01; 379/373.01
(58) Field of Search .............. 379/67.1, 68, 72, 379/76, 82, 88.01, 88.12, 93.35, 142.08, 179, 207.16, 208.01, 209.01, 210.01, 215.01, 252, 373.01, 373.02, 373.03, 373.04, 373.05, 388.01, 388.02, 420.01, 911, 48, 102.02, 102.03, 106.01, 180, 33, 35, 38, 41, 46, 51, 374.01, 374.02, 374.03

(56) References Cited

U.S. PATENT DOCUMENTS

| | | | | |
|---|---|---|---|---|
| 4,481,382 A | * | 11/1984 | Villa-Real | 455/556 |
| 4,737,981 A | * | 4/1988 | Hoberman et al. | 379/112 |
| 4,969,180 A | * | 11/1990 | Watterson et al. | 379/58 |
| 5,086,385 A | * | 2/1992 | Launey et al. | 364/188 |
| 5,652,789 A | * | 7/1997 | Miner et al. | 379/201 |
| 5,794,163 A | | 8/1998 | Paterson et al. | 455/568 |
| 6,086,377 A | * | 7/2000 | Pinder et al. | 434/118 |
| 6,128,012 A | * | 10/2000 | Seidensticker, Jr. et al. | 345/336 |
| 6,252,755 B1 | * | 6/2001 | Willer | 361/119 |
| 6,329,937 B1 | * | 12/2001 | Harman | 341/118 |
| 6,430,599 B1 | * | 8/2002 | Baker et al. | 709/203 |

FOREIGN PATENT DOCUMENTS

EP 0 675 609 10/1995

* cited by examiner

Primary Examiner—Allan Hoosain
(74) Attorney, Agent, or Firm—William H. Bollman

(57) ABSTRACT

An audible signal associated with an event is provided as part of the audio path of a telephone. In particular, a telephone according to one embodiment of the invention includes a microphone adapted to receive audible signals from a user and to convert the audible signals to electrical signals for transmission to a distant party, and a speaker adapted to receive electrical signals associated with input from the distant party and to convert the electrical signals to audible signals. According to the invention, the telephone also includes a processor adapted to produce electrical signals associated with an external event, and to integrate these electrical signals with the received electrical signals. In an alternative embodiment according to the invention, a method of alerting a party to a telephone conversation of an external event includes the step of providing an indication of the external event to the party from a speaker of the telephone during the telephone conversation. The external event can be a time of day, for example, and the indication can be a distinctive chime or an announcement of the time.

10 Claims, 2 Drawing Sheets

ALERT SIGNAL DURING TELEPHONE CONVERSATION

FIELD OF THE INVENTION

The invention is directed to the field of telephony, and more particularly to the advantageous use of the sounds provided to a telephone speaker.

BACKGROUND OF THE INVENTION

When people talk on the telephone, they sometimes become so involved in a telephone conversation that they lose track of time. It is not uncommon for a party on a telephone conversation to suddenly remember an important event and abruptly declare to the other party something along the lines of "Sorry, I just remembered X, I have to go." At which point the conversation will terminate by the party hanging up the party's telephone. "X" can be anything from picking up one's child at the bus stop, to watching a favorite television show, to turning off the oven before dinner is burned.

If the party is fortunate, the memory of the important event occurs in time for the party to take corrective action with no significant or catastrophic consequences. For example, the party may arrive at the bus stop just in time to collect the party's child, or the party may be able to turn off the oven before the dinner is ruined. Sometimes, however, the party's recollection of the event is too late, and the consequences can range from merely inconvenient to severe. There is a need, therefore, for a method and apparatus to alert a party involved in a telephone conversation to the time of day, the occurrence of an important event, or the upcoming occurrence of an important event.

SUMMARY OF THE INVENTION

This need is met by providing an audible signal associated with an event as part of the audio path of the telephone. In particular, a telephone according to one embodiment of the invention includes a microphone adapted to receive audible signals from a user and to convert the audible signals to electrical signals for transmission to a distant party, and a speaker adapted to receive electrical signals associated with input from the distant party and to convert the electrical signals to audible signals. According to the invention, the telephone also includes a processor adapted to produce electrical signals associated with an external event, and to integrate these electrical signals with the received electrical signals.

In an alternative embodiment according to the invention, a method of alerting a party to a telephone conversation of an external event includes the step of providing an indication of the external event to the party from a speaker of the telephone during the telephone conversation. The external event can be a time of day, for example, and the indication can be a distinctive chime or an announcement of the time.

BRIEF DESCRIPTION OF THE DRAWING

Objects and advantages of the invention will be apparent to one of skill in the art upon review of the following detailed description in light of the drawing, wherein.

DETAILED DESCRIPTION

Figure 1:
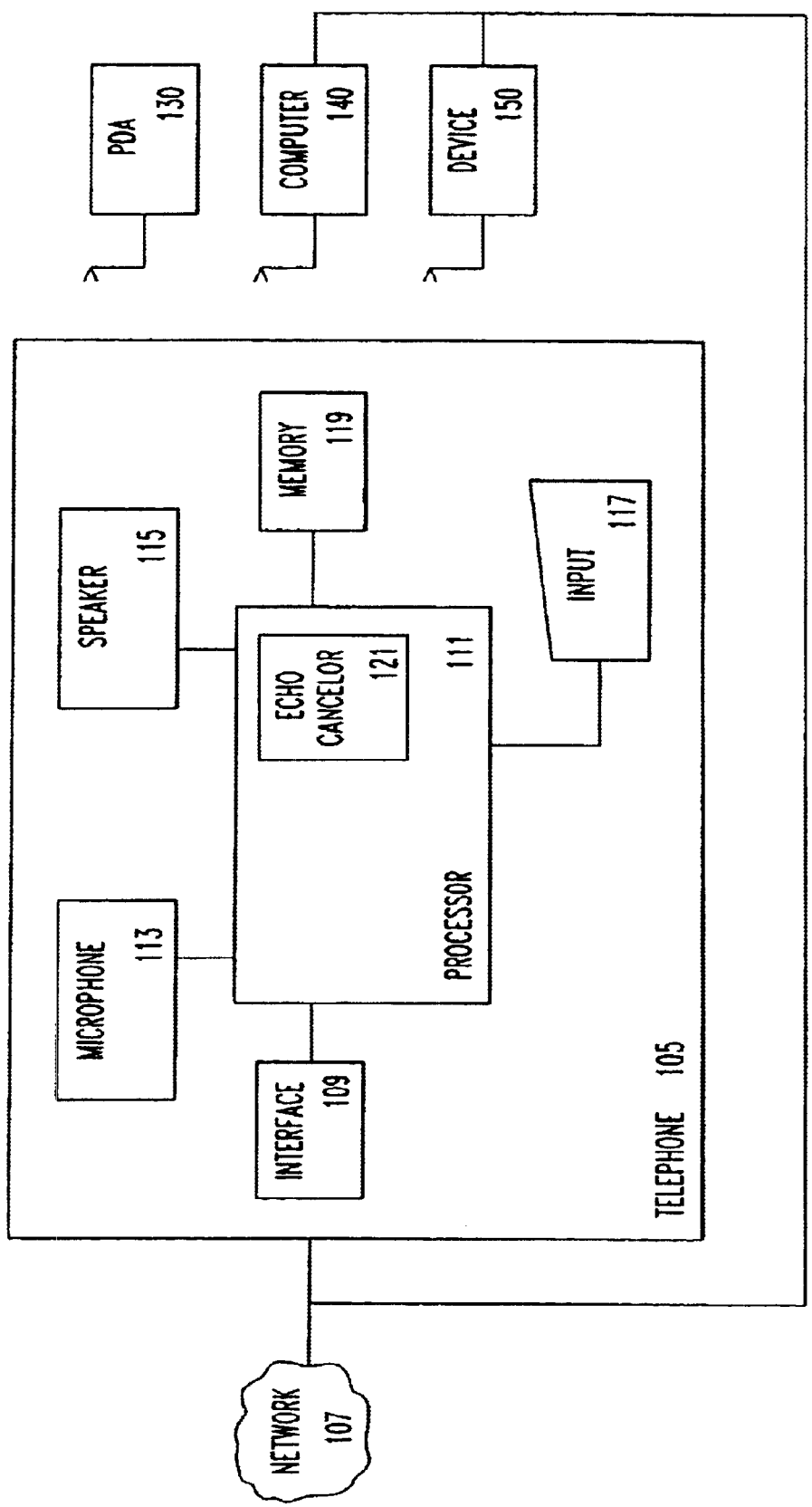
FIG. 1 is a simplified block diagram of an exemplary telephone configured according to the invention.

FIG. 1 shows an exemplary telephone 105 configured to operate according to the invention. In this embodiment, telephone 105 is a wired telephone coupled to a network 107, such as the public switched telephone network (PSTN), via a telephone line interface 109, although aspects of the invention may be advantageously employed in any kind of telephone coupled to any kind of network.

Telephone 105 includes a processor 111, such as an integrated circuit microcontroller or digital signal processor. The processor 111 is adapted to control the operations of telephone 105, and in addition to controlling conventional telephone operations, processor 111 is adapted to control operations according to the invention. It is, of course, possible to incorporate the functionality of the invention into a separate processor, but is likely more practical to integrate the functionality into a processor that is already required as part of the design of telephone 105.

Processor 111 is linked to a microphone 113 and a speaker 115, such as are conventionally configured within a telephone handset or as part of a base unit speaker phone application. Additional elements, such as a codec, which are conventional in a telephone, are not described herein, although one of skill in the art is clearly aware of their usefulness, necessity and desirability in a device configured according to the invention. Instead, to facilitate an understanding of the invention, the description herein is directed to particular elements that function in an unconventional manner to implement an embodiment according to the invention.

As illustrated, the processor 111 is in the audio path between the interface 109 and the transducers 113 and 115. This is mostly for illustrative purposes, as it is, of course, possible for the processor to be out of the path, such that there is a more direct link between the interface and the transducers, such that the processor acts upon the link according to the invention but is not necessarily part of the link. For example, the link can exist in a conventional manner, and the processor can output a signal onto the link for integration into the signal stream provided to speaker 115.

The signal output by processor 111 may be, for example, a simple tone, a tone pattern, or a chime. For example, the processor 111 may be programmed to output a chime on a periodic basis, such as once every ten minutes, to provide a party engaged in a telephone call a sense of the passage of time. Alternatively, the processor 111 may be adapted to output an indication of the actual time. For example, the processor may have stored therein digital recordings of the components of each ten minute interval, or the processor 111 may include a text-to-speech module programmed to output an announcement of the actual time. This announcement may be on a periodic basis, or may be provided in response to input from the user.

Alternatively, the announcement may be base on a particular telephone condition, such as a low battery. Also, the announcement and/or the frequency of the announcement may vary depending on the basis for the announcement. For example, if the basis for the announcement is merely to inform the user of periodic passage of time, the announcement may occur once every ten minutes. On the other hand, if the announcement is to inform or remind the user of a low battery condition, the announcement may occur every minute. The input from the user may be provided to an input unit 117, which may be, for example, a keypad, and which may also be used for keypad input to control conventional telephone functions. Input unit 117 may also or alternatively be configured as a wireless transceiver to receive input, such as according to the 802.11 or Bluetooth standards, incorporated herein by reference, or according to other wireless link standards, from one or more input providers. Exemplary input providers are illustrated as a personal digital assistant (PDA) 130, a computer 140, or a device 150, such as a household appliance.

For example, the personal digital assistant 130 and/or the computer 140 may contain a scheduling or calendar program which the user employs to keep track of important events. Such a scheduling program may typically be configured to provide the user with an advance notification of an upcoming appointment. For example, the PDA 130 may output an audible signal fifteen minutes before an appointment to remind the user of the appointment. Similarly, the computer 140 may provide a visual alert on a monitor, potentially coupled with an audible alert, to provide the user with advance warning of the appointment.

However, if the user is not proximate to the PDA 130 and/or computer 140, the user may not be aware of the signals being issued thereby. For example, if the user is engaged in a telephone call and is somewhat oblivious to the events going on around the user, or if the telephone call causes the user to be at a location that is not proximate to the PDA 130 and/or computer 140, then the user may be unaware of the warning and may thus miss the appointment. According to the invention, however, telephone 105 is made aware of the appointment by, for example, sensing a signal in input element 117, whereby processor 111 subsequently causes a similar warning signal to be integrated into the audio path to help insure that the user is made aware of the appointment.

The processor 111 may be configured to provide a real time replica of any received alert signal, such that the PDA 130 and/or computer 140 are merely adapted to output a wireless signal in concert with other signaling targeted to the user. The input element 117 is thus adapted to receive such transmissions and notify the processor 111, and the processor 111 is adapted to cause the appropriate signal to be integrated into the audio path. Alternatively, the PDA 130 and/or computer 140 may be adapted to provide information to input element 117 relating to a plurality of events. For example, the user may instruct the PDA 130 to upload the PDA's calendar of events to the telephone 105. As a result, data relating to a plurality of events are transferred via the wireless link to input element 117 and received by processor 111. Processor 111 causes these data to be stored in a memory 119. In one embodiment, memory 119 thus includes a replica of at least some of the scheduling information contained in PDA 130 (or computer 140), and processor 111 and memory 119 thus coordinate to locally generate appropriate alert or warning signals, particularly when telephone 105 is in an off-hook condition.

Device 150, which is an alternative source for input, may be, for example, a home appliance. An exemplary home appliance may be an oven that provides a signal when a cooking cycle is complete. Alternative appliances may be a clothes dryer providing a signal indicating that a drying cycle is complete, a washer providing a signal that a washing cycle is complete or that there is a problem with an unbalanced load, or any other form of home appliance that typically provides indicia to a user. The signal from the home appliance, according to the invention, is recognized by the processor 111 and causes a particular signal to be integrated into the audio path.

The above description details a wireless link between the PDA 130, computer 140, appliance 150 and the telephone 105. Alternatively, as also depicted in FIG. 1, the connection may be a wired connection, such as via telephone lines within a home, such that the communication is according to, for example, a home telephone line communication standard, such as the Home Phone Line Network Alliance (HomePNA) standard, incorporated herein by reference.

The devices 130, 140 and 150 may automatically output signals over the home telephone line, regardless of whether telephone 105 is in an off-hook or on-hook condition. Alternatively, one or more of the devices may include a parallel set detect module coupled to an internal telephone line interface, whereby a processor within the device checks to see if a parallel set (e.g., telephone 105) is off-hook, and if so, then the signals are sent.

Figure 2:
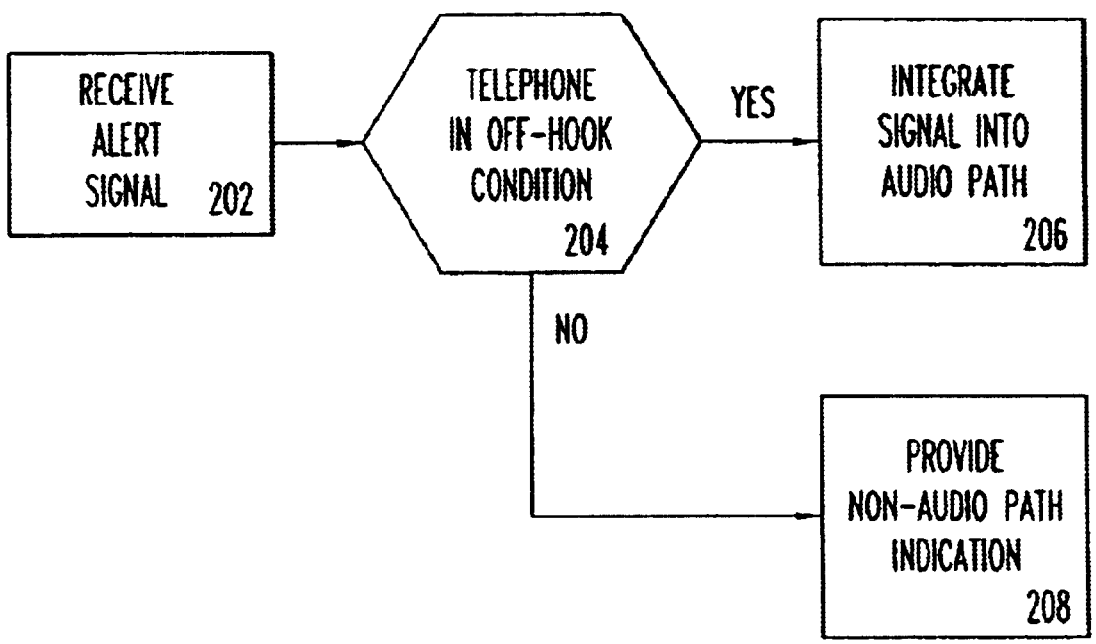
FIG. 2 is a simplified operational flowchart describing an exemplary operational configuration of a telephone according to the invention.

FIG. 2 provides a simplified operational flowchart of an embodiment according to the invention. At step 202 an alert signal is received by telephone 105. At step 204 a determination is made as to whether telephone 105 is in an off-hook condition. If the answer at step 204 is YES, then an appropriate signal is integrated into the audio path at step 206. If, on the other hand, the answer at step 204 is NO, then either no signal is provided, or an alternative signaling scheme that does not utilize the audio path is employed (step 208).

As discussed earlier, the steps 204 and 206 may be proximate in time with the step 202, such that a received alert signal results in a real time inquiry and signaling. Alternatively, the alert signal receipt at step 202 may be temporally spaced from step 204 and/or 206. Further, the signal received at step 202 may provide information regarding the timing of steps 204 and 206.

Based on an understanding of these various embodiments, one of skill in the art is likely to conceive of alternative embodiments that are not specifically enumerated here, but that are clearly within the scope of the invention. For example, the aforementioned embodiments describe the provision of a signal integrated into an audio path of a telephone. It is, of course, possible to couple such an audio signal with an audible signal that is not part of the audio path, as well as a visual or other form of sensory based signal.

What is claimed is:

1. A telephone line device, comprising:

a telephone line interface; and a spoken voice time stamp injection module, in communication with said telephone line interface, adapted to periodically inject a spoken voice time stamp through said telephone line interface so that an electrical signal corresponding to said spoken voice time stamp is integrated with an electrical signal corresponding to input from a caller to a telephone in communication with said telephone line interface;

wherein a user of said telephone in communication with said telephone line interface hears said spoken voice time stamp.

2. The telephone device according to claim 1, wherein:

said spoken voice time stamp is injected only when said telephone line interface is in an off-hook condition.

3. A telephone device, comprising:

a telephone line interface;

a home network interface separate from a telephone line corresponding to said telephone line interface; and a receiver adapted to receive an alert signal associated with a home appliance external to said telephone device over said home network interface, and to integrate an electrical signal corresponding to said alert signal with electrical signals corresponding to input from a caller to said telephone device.

4. The telephone device according to claim 3, wherein:

said receiver is a wireless receiver.

5. The telephone device according to claim 4, wherein:

said home network device is a HomePNA device.

6. The telephone device according to claim 4, wherein said home appliance comprises:

a PDA device.

7. The telephone device according to claim 4, wherein said home appliance comprises:

a washing machine.

8. The telephone device according to claim 4, wherein said home appliance comprises:

clothes dryer.

9. The telephone device according to claim 4, wherein said home appliance comprises:

a cooking appliance.

10. The telephone device according to claim 4, wherein said a cooking appliance comprises:

oven.

* * * * *